Nov. 25, 1947.    S. R. ELLINGHAM ET AL    2,431,547
MAGNETO
Filed Feb. 21, 1946    5 Sheets-Sheet 1
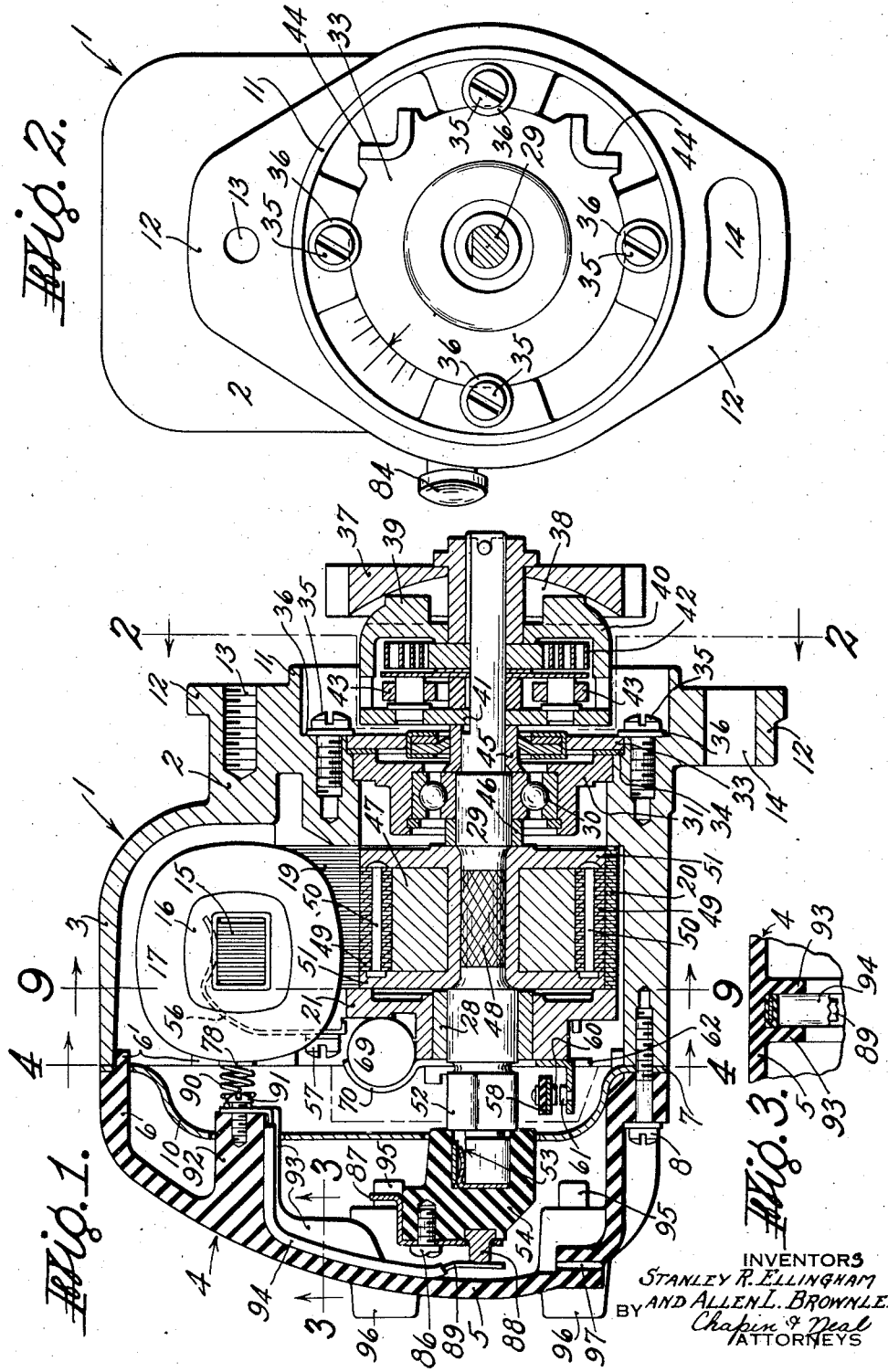
INVENTORS
STANLEY R. ELLINGHAM
AND ALLEN L. BROWNLEE
BY Chapin & Neal
ATTORNEYS

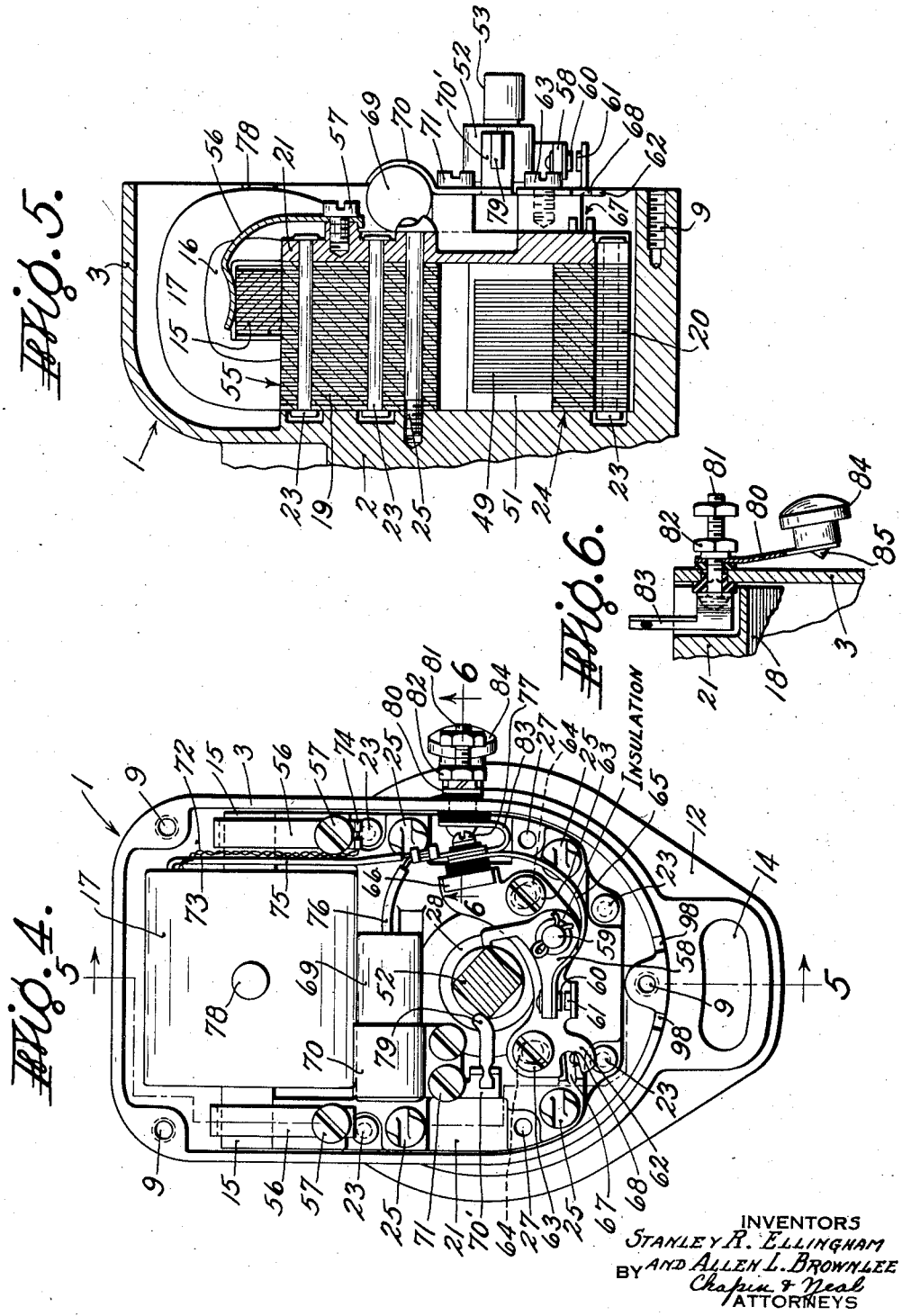

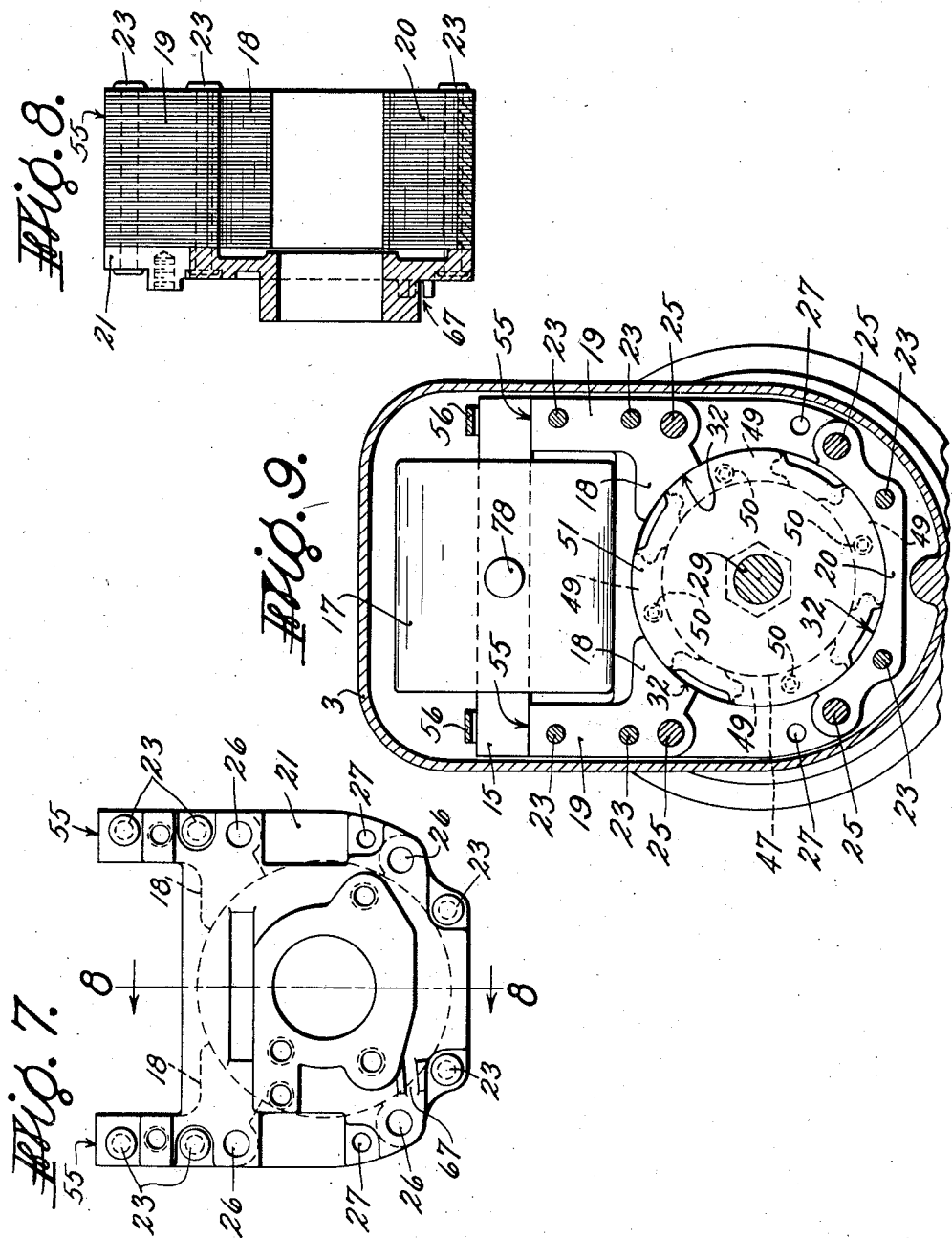

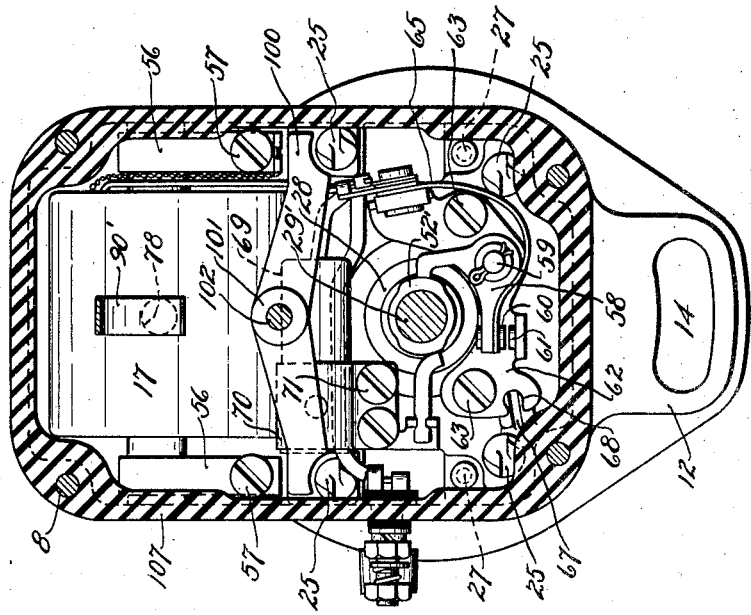

Patented Nov. 25, 1947

2,431,547

UNITED STATES PATENT OFFICE 2,431,547

MAGNETO

Stanley R. Ellingham, Springfield, and Allen L. Brownlee, West Springfield, Mass., assignors to Wico Electric Company, West Springfield, Mass., a corporation of Massachusetts Application February 21, 1946, Serial No. 649,338

13 Claims. (Cl. 171—209)

This invention relates to improvements in magnetos.

The invention has for its general object the provision of an improved arrangement of the parts in the magneto housing, including the grouping of the parts in various sub-assemblies for convenience in manufacture and the mounting of these sub-assemblies in the housing in special ways, the whole affording advantages in manufacture enabling important reductions in cost and affording a better product which is unlikely to require frequent servicing but which may readily be serviced when required.

The invention has for another object the provision in a magneto of a frame that carries on one face the stator pole pieces and on the other face the breaker plate, breaker arm, condenser and, if desired, a wiper for the breaker cam and, in addition has mounted therein a bearing for the rotor shaft, such frame being permanently secured in the magneto housing and then having its pole pieces and the bore for the bearing finished at the same time that the housing is finished, the irremovability of the frame and its pole pieces affording a foolproof arrangement insuring the maintenance of the finished surfaces in proper relation with finished surfaces of the housing.

The invention has for a further object the provision in a magneto of improved means for fastening the coil core to its pole pieces.

The invention has for another object the provision in a magneto of improved means for adjusting the breaker mechanism.

The invention has for a further object the provision in a magneto of improved connections between the high tension terminal of the secondary coil and the distributor.

The invention has for a further object to provide in connection with the aforesaid pole-piece-carrying frame, a member for rotatably supporting a distributor rotor which is geared to the shaft of the magnetic rotor, such member being permanently fastened to the housing by the same means which fasten the frame thereto and being machined at the same time as said frame is machined.

The invention will be disclosed with reference to the accompanying drawings, in which—

Fig. 1 is a sectional elevational view of a magneto embodying the invention;

Figs. 2, 3 and 4 are sectional views taken on the lines 2—2, 3—3 and 4—4, respectively, of Fig. 1;

Figs. 5 and 6 are sectional views taken on the lines 5—5 and 6—6, respectively, of Fig. 4;

Fig. 7 is an end elevational view of the stator pole piece unit;

Fig. 8 is a sectional view thereof taken on the line 8—8 of Fig. 7;

Fig. 9 is a fragmentary cross sectional view taken on the line 9—9 of Fig. 1;

Figure 10:
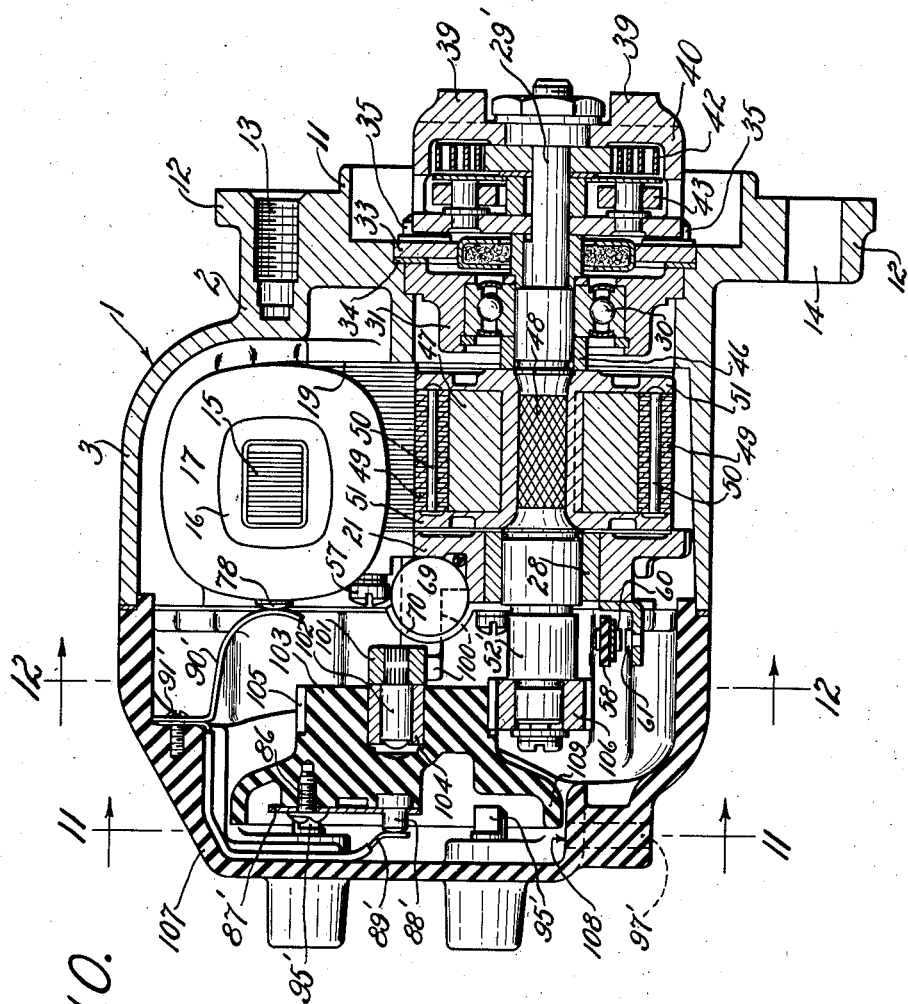

Fig. 10 is a sectional elevational view of another form of magneto embodying the invention; and Figs. 11 and 12 are cross sectional views taken on the lines 11—11 and 12—12, respectively, of Fig. 10.

Referring to these drawings, the magneto housing (Fig. 1) includes a hollow, die-cast member 1 of non-magnetic material, which has an end wall 2 with an opening therethrough large enough to permit passage of the rotor, and a peripheral wall 3. The housing also includes a cover 4 of insulating material, which has an end wall 5 and a peripheral wall 6. The peripheral walls 3 and 6 are held together with a gasket 7 clamped therebetween by a plurality of screws, one of which is shown at 8 in Fig. 1, inserted in the threaded holes, shown at 9 in Fig. 4. The gasket, as herein shown, is formed by the marginal portion of a diaphragm 10 of suitable material, which serves to partition the interior of the magneto housing into two compartments, one compartment (mostly within member 1) for the stator, rotor, breaker and condenser and the other (wholly within cover 4) for the distributor. The wall 6 preferably has a plurality of spaced flanges 6' which pass through slots in the diaphragm 10 and engage inside the wall 3 to maintain the peripheral walls 3 and 6 in alignment.

The housing may be mounted either horizontally or vertically as desired and will have mounting flanges which are appropriate for the style of mounting desired. The particular housing shown is adapted to be mounted horizontally and to be secured to the crankcase of an internal combustion engine. For this purpose, the end wall 2 has a pilot flange 11 to closely fit a cylindrical opening in such crankcase and a flange 12 adapted to be suitably secured to a wall of the crankcase, as for example by a cap screw (not shown) passing through a slot in an ear on the crankcase and threaded into hole 13 and by a bolt (not shown) passing through another ear on the crankcase and through the slot 14.

The stator of the magneto (Fig. 9) includes a laminated iron core 15 on which are mounted primary and secondary coils 16 and 17, respectively, and suitable laminated iron pole pieces 18, each having parallel extensions 19, the outer ends of which are engaged one with each of the ends of the coil core 15. In this particular case, there is a third laminated iron pole piece 20 which is used for shunting purposes in connection with a four pole rotor. Obviously, the number, shape, size and location of these pole pieces will vary according to the particular use for which the magneto is designed. These pole pieces are mounted on a non-magnetic frame member 21, shaped as shown in Fig. 7. The laminations of each pole piece are clamped together and to member 21 by a pair of rivets 23 (Figs. 5, 8 and 9). The unit, comprising the frame 21 and the several pole pieces 18 and 20, is clamped against a seat 24 (Fig. 5) on the end wall 2 of the housing member 1 by means of a plurality (four as shown in Fig. 4) of irremovable screws 25. The heads of these screws are so formed that they may be turned inwardly but not outwardly. Thus, this unit is permanently fastened in the housing. The holes 26, shown in Figs. 7 and 9, are to receive these screws. The holes 27 there shown are rivet-receiving holes, which may be used in a case where the stator has two diametrically-opposed pole pieces.

The member 21 also has therein a sleeve bearing 28 for supporting one end of the shaft 29 of the magnetic rotor. The other end of such shaft is supported by a ball bearing 30 (Fig. 1) mounted in a cage or support 31, seated in a counterbore in the cylindrical opening in the end wall 2 of housing member 1. After the unit shown in Figs. 7, 8 and 9 has been clamped to its seat 24 in the housing member 1, the bore to receive sleeve bearing 28, the arcuate surfaces 32 of the several pole pieces, the counterbore for cage 31 and its shoulder, and another and larger counterbore for a bearing-retaining disk 33 and its gasket 34 are finished at one time. Thus, it is insured that all the surfaces described are in true coaxial relation. After these machining operations have been performed, the bearing 28 is inserted in the bore in frame 21. The bearing 30 is then placed in cage 31 and this assembly is placed on the shaft. The shaft and parts assembled thereon are inserted in place in the housing with the shaft engaged in bearing 28. The periphery of cage 31 has been previously machined to closely fit the counterbore in housing member 1 and to lie in true coaxial relation with the bearing 30. The cage 31 is then placed in such counterbore. Then gasket 34 and disk 33 are put in place and held there by a plurality of screws 35 (four as shown in Fig. 2) and washers 36, the latter partially overlapping disk 33 as shown in Figs. 1 and 2. The disk 33 thus serves to retain the bearing support 31 seated against the shoulder in its counterbore.

The outer end of shaft 29 is provided with any suitable means for effecting a driving connection with the engine and such means may vary widely according to the needs in various installations. In the present case, a gear 37 is rotatably mounted on shaft 29 and adapted to mesh with an engine-driven gear within the engine crankcase. This gear has a slot 38 on one face to receive projections 39 on a member 40 of an impulse coupling. This coupling includes a driven member 41 fixed to shaft 29, an impulse spring 42 and two pawls 43, which at low speeds are adapted to successively engage the stops 44 fixed on disk 33. The details of the coupling are not important to the present invention and need not be described in further detail. The purpose of the coupling is to function at very low engine speeds and on starting and give intermittently (in this case every quarter revolution) spring impulses to the rotor. These coupling parts may be assembled on the shaft before the latter is put in place in the housing.

There is a spacer sleeve 45 between the coupling member 41 and one end face of the inner race of ball bearing 30 and a spacer sleeve 46 between the other end face of this inner race and the adjacent end face of the magnetic rotor.

The magnetic rotor comprises a cylindrical permanent magnet 47 (Fig. 9) having a hexagonal opening therethrough to receive a knurled portion 48 (Fig. 1) of shaft 29. Pole shoes 49 of laminated iron (Fig. 9) have inner part-cylindrical surfaces to fit the outer periphery of the magnet 47. These shoes are riveted together as at 50 and spot welded to the magnet. Then, the magnet, shoes and shaft are placed in a suitable die and non-magnetic metal 51 is cast therein to fill the space between the knurled part 48 of the shaft and the hexagonal bore in the magnet and to encompass the end faces of the magnet and shoes and part of the outer periphery of the magnet. This metal also interlocks with the notched sides (Fig. 9) of each pole shoe 49. In this case, there are four pole shoes spaced 90° on centers. The shaft 29 (Fig. 1) is extended to the left beyond the bearing 28 and is formed with a breaker cam 52 (in this case a four-lobed cam) and with a flattened end 53 to drivingly engage the rotor 54 of the distributor.

The coil-carrying core 15, previously described, is put in place after the pole piece unit shown in Figs. 7 and 8 has been permanently fastened in the housing and all machining on it has been effected. The upper faces 55 of the pole piece extensions 19 are suitably finished, as by grinding, prior to the mounting of said unit in housing member 1, and such faces are flat and lie in the same horizontal plane. The end portions of the lower face of core 15 will engage and closely fit one with each such face. The core is then held in place by spring clips 56, one at each end of the core. Each clip is held to the frame 21 by a screw 57. As each screw is turned inwardly, the effect is to swing the clip 56 to the left as viewed in Fig. 5 and cause the upper end to be pressed against the core and, finally, when the screw is completely turned in, to cause the upper part of the clip to bear against the core with considerable spring pressure.

The frame 21 (Fig. 4) also supports the breaker mechanism. This consists of a breaker arm 58 of insulating material, pivotally mounted on a stud 59, fixed to frame 21 and carrying a breaker point 60 to cooperate with a normally fixed but adjustable breaker point 61. The latter is fixed to an out-turned ear of a supporting plate 62 which is fulcrummed on stud 59 and held to frame 21 by two screws 63, each passing through a curved slot 64 in the plate, which slot is curved coaxially with the stud 59. A spring 65, fixed at one end to breaker point 60 and at the other end fixed to but insulated from an ear 66 on plate 62, tends to press one end of the breaker arm toward cam 52 and to engage or close the points 60 and 61. The spring 65 also serves as an electrical conductor. By loosening screws 63, the breaker plate 62 may be turned about the axis of stud 59 to adjust the amount of opening of the breaker points. To facilitate this action, a notch 67 is provided on frame 21 and a notch 68 is provided on plate 62. These notches lie one in back of the other and they are approximately aligned. As will be clear from Fig. 5, a screw driver may be passed through notch 68 and into notch 67. Then the screw driver may be used as a lever to move the plate 62, using a wall of notch 67 as a fulcrum.

The frame 21 also carries a condenser mounted in a metallic tubular case 69 which is clamped against one face of the frame by a clip 70 and screws 71, threaded into the frame.

One terminal of the condenser is connected to case 69 and is grounded by the metallic clip 70 and screws 71 to frame 21 and thus to housing member 1. The breaker point 61 is grounded through plate 62 and frame 21 to member 1. One terminal of each coil is grounded. As shown, bare lead wires 72 and 73 for coils 16 and 17, respectively, are twisted together and fastened to a clip 74, which is secured beneath one of the screws 57. The other terminal of the primary coil 16 and the other terminal of the condenser are connected by wires 75 and 76, respectively, to spring 65 by a screw 77. The other terminal secondary coil 17 consists of a metallic button 78.

The frame 21 also carries a wick 79, such as felt, for example, which may be saturated with oil and used to lubricate cam 52 or which may be used without oil merely as a wiper to keep the cam clean. This felt is fixed at one end to an extension 70' of the condenser clip 70.

Where a grounding switch is desired, it may be applied as shown in Figs. 4 and 6. This switch may consist of a spring blade 80 which is located outside housing member 1 and fixed at one end to and insulated from the housing. The fixed end of the blade is held in place by a bolt 81, which passes through the housing, and a nut 82. This bolt and nut also clamp in place a conducting strip 83 which is connected by the screw 77 to the primary wire 75. The switch blade 80 has on its free end a handle 84 and a contact 85. By pressing on handle 84, contact 85 may be engaged with the peripheral wall 3 of the metallic housing member 1 to thereby short circuit the primary coil 16 by grounding its terminal 75.

The distributor rotor 54 (Fig. 1), which is fixed to and rotates with the shaft 29, has fixed to its outer face by an irremovable screw 86, a metallic strip 87, forming the distributor finger. Coaxial with shaft 29, there is formed in the outer face of the arm 54 a seat to receive the flanged inner end of a carbon contact 88. The inner end of strip 87 has a hole to receive the contact 88 and presses against the flange of the contact to hold the latter in its seat. Connection between this contact and the high tension terminal 78 is made by means of an interlead consisting of a leaf spring 89 and a coil spring 90. One end of the leaf spring and one end of the coil spring are fixed by a screw 91 to a boss 92 which projects through an opening in partition 10. The other end of the coil spring 90 presses against the terminal 78. From its fixed end, the leaf spring extends along and below the boss 92 and along the inner face of wall 5 (see also Fig. 3). The lower end of the leaf spring is offset inwardly from wall 5 and bears against the outer end of contact 88. This leaf spring is insulated as at 94 to space it from the wall 5. The outer end of finger 87 cooperates successively with a circular series of segments 95 fixed in and projecting inwardly from sockets 96 formed in wall 5 and adapted to receive one in each the spark plug wires in the usual manner. The mounting of the contact 88 in the rotor rather than in the cover of the distributor, as is usual, tends to reduce leakage. The cover is likely to become moist and dirty and, when this condition exists and when the carbon contact is mounted in the cover, there is a relatively short and easy leakage path along the cover in radial directions from the carbon contact 88 to the several segments 95 of the circular series. With the present arrangement, the leaf spring conductor 89 is kept spaced from wall 5 of the distributor chamber and the leakage paths from it to the segments 95 of the circular series are made longer and more difficult. The flanges 93 form barriers to increase the length of the leakage paths, especially at the location where the conductor 89 passes between the upper two contacts 95 of the radial series. The distributor chamber is preferably vented, as shown at 97 in Fig. 1.

The peripheral wall 3 of the housing section 1 (Fig. 4) has formed in its lower portion two small slots 98 which serve as drainage openings to carry off any condensation which may be formed inside the housing.

In operation, the magnetic rotor four times during each revolution establishes a magnetic circuit through core 15 and coils 16 and 17 first in one and then in an opposite direction. Referring to Fig. 9, the rotor revolves counterclockwise and successive pole shoes 49 are of opposite polarity. When one shoe, say of north polarity, connects with the left hand pole piece 18, another shoe, say of south polarity, connects with the right hand pole piece 18, whereby flux flows from left to right through the core 15. The breaker points 60 and 61 are open while two shoes 49 move into full connecting relation with two pole pieces 18. The points then close and remain closed until these shoes have moved out of connecting relation with the pole pieces 18 and two other shoes have moved into such relation, whereupon the points separate and open the primary circuit and create a spark. The breaker points begin to open when the trailing edge of a pole shoe 49 is spaced say three-sixteenths of an inch from the nearest edge of the pole piece 18 with which it has just become disconnected. The points become fully open when the shoes and pole pieces occupy the relative positions shown in Fig. 9. In the arrangement shown, the pole shoes function two at a time and while two are functioning, the other two are connected by the shunting pole piece described. The operation described is the usual one. As pointed out above, other arrangements of pole shoes and pole pieces may be used to produce a greater or a less number of sparks per revolution of the rotor and the invention is not limited to the one particular arrangement of pole shoes and pole pieces herein illustrated.

This invention is more particularly concerned with the arrangement of parts and the grouping of them in various sub-assemblies that are separately made and later assembled in the housing. Thus, the frame 21, having the laminated pole pieces 18 and 20 riveted thereto constitutes one sub-assembly. The ends of the pole piece extensions 19 are finished on surface 55 to lie in one common plane before this sub-assembly is mounted in the housing 1. The various holes for the rivets 23, and the holes 26 and 27 are formed during the casting operation. The holes for screws 57, 63 and 71 are also cast and simply need to be tapped. When these operations have all been performed, this sub-assembly is mounted in the housing 1 and permanently fastened in place by the irremovable screws 25, which firmly clamp the frame 21 and the laminated pole pieces 18 and 20 against the seat 24 on the end wall 2 of the housing 1. If this housing is die cast, the seat 24 will be sufficiently smooth so that it need not be finished. The housing 1 is then set up in a suitable machine and the bore for sleeve bearing 28, arcuate surfaces 32 of the pole pieces 18 and 20, the counterbores and shoulders for support 31 and disk 33, the pilot flange 11 and any other surfaces desired, are finished at one time and prepared to receive parts of the second sub-assembly. A hole is drilled in frame 21 to receive stud 59. The second sub-assembly comprises the magnetic rotor including its shaft 29, the spacer sleeve 46, the ball bearing 30 and its support 31, the spacer sleeve 45, the disk 33 and gasket 34, the driving coupling (which may be an impulse coupling as shown or any other desired form), and the gear 37. The rotor has its periphery finished and its shaft 29 finished to lie in true coaxial relation. The breaker cam 52 is formed as is also the part 53 to receive the distributor rotor 54. Then the previously finished parts 46, 30, 45, 31, 34 and 33, the impulse coupling parts and the gear 37 are applied to the right hand part of shaft 29 in the order named, after which the second sub-assembly is put in place. This is done by inserting the rotor through the large opening in end wall 2 and pushing the forward end of shaft 29 through the sleeve bearing 28. The part 53 and cam 52 will pass through this bearing and the journal, which is located between the cam 52 and the rotor, will rotatably fit the sleeve bearing 28. The support 31 is then seated in its counterbore and gasket 34 and disk 33 are put in place in its counterbore and held in position by the screws 35. The support 31, when seated against the shoulder in its counterbore, will position the rotor in proper axial relation with the stator and the close fit of this disk in its counterbore will insure that the finished convex surfaces of the rotor pole shoes 49 will lie in true coaxial relation with the finished concave surfaces 32 of pole pieces 18 and 20 of the stator. The third sub-assembly, comprising the core 15 and coils 16 and 17 is put in place by laying the ends of the core on the finished surfaces of the pole piece extensions 19 and fastening such ends with the clips 56 and screws 57. Then the breaker parts 59, 58 and 62 are mounted on frame 21 together with the condenser 69 and cam wiper 79. The various electrical connections are made and the grounding switch mounted, if one is desired. Then the partition 10 is laid in place and the distributor rotor 54 placed on the portion 53 of shaft 29. Then, the cover 4, having the distributor contacts 95 molded therein and the springs 89 and 90 applied thereto, is put in place and secured by the screws 8. The assembly is then complete.

Another embodiment of the invention is shown in Figs. 10, 11 and 12. The mounting of the stator, rotor, and the breaker mechanism in the housing 1 is generally the same as in the first form of the invention shown in Figs. 1 to 9 and corresponding parts have been given the same reference numerals. Actually, the stator will have two diametrically opposed pole pieces and the rotor will have two diametrically opposed pole shoes and the shunt 20 will be omitted. The housing 1 is adapted for crankcase mounting, as before, but the shaft 29' is adapted to be driven at engine crankshaft speed rather than camshaft speed so that the lugs 39 on the impulse coupling member 40 are adapted to engage a coupling member on the engine crankshaft instead of the gear shown in Fig. 1.

Since the magnetic rotor and breaker cam 52' revolve at crankshaft speed, it is necessary to provide reduction gearing of the ratio of one to two between the shaft 29' and the rotor of the distributor and to provide a separate mounting for the distributor rotor. A bridge piece 100 (Figs. 10 and 12), extends from one side of frame 21 to the other and has its ends permanently clamped to the frame by the upper pair of irremovable screws 25, which are used to clamp the frame 21 and stator laminations to the housing. This bridge, intermediate its ends, is offset to the left, as viewed in Fig. 10, to clear the condenser 69 and also to bring a central hub 101 on the bridge into the proper location to support the distributor rotor. The front face of hub 101 (adjacent the distributor rotor) is faced off and drilled to receive a stud 102 on which the distributor rotor is revolubly mounted.

The distributor rotor comprises a body 103 of suitable insulating material having a central bearing sleeve 104 to receive stud 102 and an integral gear 105, which meshes with a pinion 106 fixed on the shaft 29' adjacent breaker cam 52'. The rotor 103 has on its front face a central carbon contact 88' held in place by the distributor finger 87', which in turn is secured to rotor 103 by an irremovable screw 86; all in the manner heretofore described. A distributor cover 107 is held to the flange 3 of housing 1 in the same manner as in the first form of the invention and carries a circular series of segments 95' with which the outer end of the distributor finger successively moves into close engagement so that a spark can jump from the finger to the segment. The high tension terminal 78 of the secondary coil 17 is connected to the central contact 88' in the same general manner as before. That is, there is an interlead 89' and a spring 90', which are both fixed together at one end and to the distributor cover 107 by a screw 91' and which have their other and spring ends engaged one with contact 88' and one with terminal 78.

The distributor cover has in its inner face a cylindrical recess 108 and the distributor rotor 103 has an annular flange 109 which rotates in close proximity to the peripheral wall of said chamber so as to substantially close the distributor chamber and separate it from the chamber in which the stator and magnetic rotor are mounted. There are vent openings 97' in the cover 107 for the distributor chamber.

The assembly of the parts is effected in generally the same as in the first form of the invention. In particular, the frame 21 and the stator laminations are fixed to the housing in the same way and then finished as heretofore described. The only difference in assembly of parts in the second form of the invention is the addition of bridge piece 100, which is fixed in the housing with the frame 21 and stator laminations by the upper pair of irremovable screws 25. This is done before the front face of hub 101 is finished and before such hub is drilled to receive stud 102. The facing and drilling of hub 101 is done at the same time as the machining operations on the frame 21 and stator laminations. This insures that the axis of the stud 102 will lie in true parallel relation with shaft 29' and that the front face of hub 101 will be at right angles to such axes. The inner face of the bearing sleeve 104 of the distributor rotor 103 is pressed against the finished front face of hub 101 by the spring 89'.

The arrangements described are important as affording manufacturing advantages enabling reductions in cost and as affording a better product and one which may be serviced easily. With the magneto removed from the engine crankcase, it is only necessary to remove the screws 35 to enable the rotor to be pulled out through the large opening in the end wall 2 of the housing 1. The rotor 54 will pull off the shaft 29 unless it has previously been removed after first having removed the distributor cover 4, which may be and usually is done. In the second form of the invention, it is necessary to remove cover 107 and pinion 106 after which the rotor may be removed in the same way. But the rotor and all parts thereon may be removed quickly and easily and, in particular, this may be done without removing the impulse coupling or taking it apart as is often necessary in other magnetos.

We claim:

1. In a magneto, a casing having an end wall with a cylindrical opening therethrough and a peripheral wall projecting from the end wall; a stator unit comprising a frame member, having a bearing-receiving opening, and laminated pole pieces permanently secured to said member; said unit being permanently secured to said end wall and its bearing-receiving opening and pole pieces being finished to lie in true coaxial relation with said first-named opening, a bearing mounted in the bearing-receiving opening, a magnetic rotor having pole shoes for cooperation with said pole pieces and being of a size to pass through said first-named opening, a shaft for the rotor supported near one end in said bearing, a second bearing for said shaft located on the opposite side of the rotor, a support for the second bearing and mounted in and closing said opening, and detachable means for holding said second support in its opening.

2. In a magneto, a casing having an end wall with an opening therethrough provided with a finished counterbore and a shoulder and a peripheral wall projecting from the end wall; a stator unit comprising a frame member, having a bearing-receiving opening, and laminated pole pieces permanently secured to said member, said unit being permanently secured to said end wall and its bearing-receiving opening and pole pieces being finished to lie in true coaxial relation with said counterbore, a bearing mounted in said bearing-receiving opening, a magnetic rotor having pole shoes for cooperation with said pole pieces and being of a size to pass through said counterbore and first-named opening, breaker mechanism mounted on said member on the side opposite from the pole pieces, a shaft for said rotor having on one side of the rotor a journal to rotatably fit said bearing and a breaker cam of a size such as to pass through said bearing, a second bearing for the shaft located on the opposite side of the rotor, a support for the second bearing having its periphery finished to closely fit said counterbore opening and mounted therein and seated against said shoulder, and readily detachable means for holding said member in seated position, whereby on removal of said holding means the second bearing, second support, shaft, rotor and breaker cam may be removed through said opening.

3. In a magneto, a casing having an end wall with an opening therethrough provided with a finished counterbore and a shoulder and a peripheral wall projecting from the end wall; a cover detachably secured to the peripheral wall and forming a distributor chamber, a distributor rotor in said chamber, a stator unit comprising a frame member, having a bearing-receiving opening, and laminated pole pieces permanently secured to said member; said unit being permanently secured to said end wall and its bearing-receiving opening and pole pieces being finished to lie in true coaxial relation with said counterbore, a bearing mounted in said bearing-receiving opening, a magnetic rotor having pole shoes for cooperation with said pole pieces and being of a size to pass through said counterbore and first-named opening, breaker mechanism mounted on said member on a side opposite from the pole pieces; a shaft for said rotor having on one side of the latter a journal to rotatably fit said bearing, a cam to actuate said breaker mechanism and a part to support and drive the distributor rotor, said cam and part being of a size to pass through said bearing; a second bearing for the shaft located on the opposite side of the rotor, a support for the second bearing having its periphery finished to closely fit said counterbore and mounted therein and seated against said shoulder, and readily detachable means for holding said second support in seated position; whereby on removal of said holding means the second bearing, the second support, the magnetic rotor and its shaft may be removed through said opening.

4. In a magneto, a casing having an end wall with an opening therethrough provided with a finished counterbore and a shoulder and a peripheral wall projecting from the end wall; a first sub-assembly comprising a frame member, having a bearing support, and laminated pole pieces permanently secured to said member; said sub-assembly being permanently secured to said end wall and its bearing support and pole pieces being finished to lie in true coaxial relation with said counterbore; a bearing mounted in said support; a second sub-assembly comprising, a magnetic rotor having pole shoes for cooperation with said pole pieces and being of a size to pass through said opening, a shaft for the rotor having on one side of the latter a journal to rotatably fit said bearing, a second bearing mounted on said shaft on the other side of the rotor, a support for the second bearing having its periphery finished to closely fit said counterbore and mounted therein and seated against said shoulder, and a coupling on said shaft outside said second support; detachable means for holding said second support in seated position and the two sub-assemblies in working relation, the second sub-assembly being separable from the first only by removing it axially through said opening after removal of said holding means.

5. In a magneto, a casing having an end wall with an opening therethrough provided with a finished counterbore and a shoulder and a peripheral wall projecting from the end wall; a first sub-assembly comprising, a frame member, having a bearing support, and laminated pole pieces permanently secured to one side face of said member, a breaker plate and a breaker arm fixed to an opposite side face of said member; said sub-assembly being permanently secured to said end wall and its bearing support and pole pieces being finished to lie in true coaxial relation with said counterbore; a bearing mounted in said support; a second sub-assembly comprising a magnetic rotor having pole shoes for cooperation with said pole pieces and being of a size to pass through said opening, a shaft for said rotor having on one side of the latter a journal to fit said bearing and a breaker cam of a size to pass through said bearing and adapted to actuate the breaker arm, a second bearing mounted on said shaft on the opposite side of the rotor, a support for the second bearing having its periphery finished to closely fit said counterbore and mounted therein and seated against said shoulder, and a drive coupling mounted on said shaft outside said support; detachable means for holding said second support in seated position and said sub-assemblies in cooperative relation; the second sub-assembly being removable on detachment of said holding means by withdrawing the bearing, the second support and rotor through said opening.

6. In a magneto, a casing having an end wall with an opening therethrough provided with a finished counterbore and a shoulder and a peripheral wall projecting from the end wall; a first sub-assembly comprising as one unit a frame member having a bearing support, laminated pole pieces permanently fastened to and on one side of said member, said pole pieces having arcuate surfaces and core-receiving surfaces, the latter being finished, a breaker plate and a breaker arm mounted on an opposite side of said member, and a bearing mounted in said member; said sub-assembly mounted in said casing by permanently clamping the frame member and pole pieces against said end walls and having its bearing support and arcuate pole piece surfaces finished to lie in true coaxial relation with said counterbore; a second sub-assembly comprising a magnetic rotor having pole shoes for cooperation with said pole pieces and being of a size to pass through said opening, a shaft for said rotor having on one side of the latter a journal to fit said bearing and a breaker cam of a size to pass through said bearing and adapted to actuate the breaker arm, a second bearing mounted on said shaft on the opposite side of the rotor, and a support for the second bearing having its periphery finished to closely fit said counterbore and mounted therein and seated against said shoulder, detachable means for holding said second support in seated position and said sub-assemblies in cooperative relation; the second sub-assembly being removable on detachment of said holding means by withdrawing the bearing, second support and rotor through said opening; and a third sub-assembly comprising a laminated core and primary and secondary coils carried by the core, said core mounted upon said finished core receiving surfaces and engaging the latter one near each end thereof; and means for holding said core and pole pieces in engagement.

7. In a magneto, a casing having an end wall with an opening therethrough provided with a finished counterbore and a shoulder and a peripheral wall projecting from the end wall; a first sub-assembly comprising, a frame member having a bearing support, laminated pole pieces permanently secured to one side face of said member, a breaker plate and a breaker arm fixed to an opposite side face of said member; said sub-assembly being permanently secured to said end wall and its bearing support and pole pieces being finished to lie in true coaxial relation with said counterbore; a bearing mounted in said support; a second sub-assembly comprising a magnetic rotor having pole shoes for cooperation with said pole pieces and being of a size to pass through said opening, a shaft for said rotor having on one side of the latter a journal to fit said bearing and a breaker cam of a size to pass through said bearing and adapted to actuate the breaker arm, a second bearing mounted on said shaft on the opposite side of the rotor, a support for the second bearing having its periphery finished to closely fit said counterbore and mounted therein and seated against said shoulder, a disk for retaining said second support in seated position, an impulse coupling mounted on said shaft outside said support, and stop means for said coupling mounted on said disk; detachable means for holding said disk to said end wall to maintain said second support in seated position and said sub-assemblies in cooperative relation, the second sub-assembly being removable on detachment of said holding means by withdrawing the second bearing support and rotor through said opening.

8. In a magneto, a casing having an end wall with an opening therethrough provided with a finished counterbore and a shoulder and a peripheral wall projecting from the end wall; a stator unit comprising a frame member having a bearing support, laminated pole pieces permanently secured to said member; said unit being permanently secured to said end wall and its bearing support and pole pieces being finished to lie in true coaxial relation with said counterbore, a bearing mounted in said support, a magnetic rotor having pole shoes for cooperation with said pole pieces and being of a size to pass through said opening, a breaker arm, and a breaker plate mounted on the other side of said member, and a condenser also mounted on said member; a shaft for said rotor having on one side of the rotor a journal to rotatably fit said bearing and a breaker cam of a size such as to pass through said bearing, a second bearing, a support for the second bearing having its periphery finished to closely fit said counterbore and mounted therein and seated against said shoulder, and readily detachable means for holding said second support in seated position, whereby on removal of said holding means the bearing, second support, shaft, rotor, and breaker cam may be removed through said opening.

9. In a magneto, a housing including an end wall and a peripheral wall; a stator including pole pieces, a connecting core and primary and secondary coils on the core; a magnetic rotor mounted in the housing and having pole shoes to cooperate with said pole pieces, a cover for said housing having an end wall and a peripheral wall to match the first-named peripheral wall, an ozone shield and dust cover comprising a member having its margins clamped between said peripheral walls and extending across them to partition the inner part of the cover from the inner part of the housing, said member having spaced openings therethrough, a distributor rotor driven by the magnetic rotor and extending in one direction through one of said openings, a boss on said cover extending in the opposite direction through the other opening, a contact on the secondary coil, a center contact on the distributor rotor, an interlead, and a spring, one end of the interlead and one end of the spring being fixed to said boss, the other end of said spring engaging the coil contact and the other end of the interlead engaging the distributor contact.

10. In a magneto, a casing having an end wall with a cylindrical opening therethrough, a frame member having fixed thereto on one side laminated pole pieces and having a bearing support, a bridge member extending across said member on the other side and having a central support for a distributor rotor; said central support being located above the bearing support and spaced therefrom in the direction of the axis of the bearing support, said bridge member having oppositely extending arms the ends of which abut said frame member and are permanently secured with the frame member and the pole pieces to said wall, said bearing support and pole pieces being finished to lie in true coaxial relation with said opening and said distributor support being finished to lie in parallel relation with the bearing support, a magnetic rotor having pole shoes for cooperation with said pole pieces and being of a size to pass through said opening, a shaft for the rotor supported near one end in said bearing, a second bearing for said shaft located on the opposite side of the rotor, a support for the second bearing and mounted in and closing said opening, detachable means for holding said second support in its opening, and a distributor rotor mounted on said central support of the bridge member and geared to said shaft.

11. In a magneto, a casing having an end wall with a cylindrical opening therethrough and a peripheral wall projecting from the end wall, a frame member having a bearing support, laminated pole pieces secured to one face of said member, a bridge member having a central hub and oppositely extending arms, the ends of which abut the opposite face of said frame member, the bridge member and frame member and laminated pole pieces being permanently secured to said wall, said bearing support and pole pieces being finished to lie in true coaxial relation with said opening and said hub being drilled to form a hole with an axis parallel with the axis of said opening, a bearing mounted in said support, a stud mounted in said hole, a magnetic rotor having pole shoes for cooperation with said pole pieces and being of a size to pass through said opening, breaker mechanism mounted on said frame member on the side opposite from the pole pieces, a shaft for said rotor having on one side of the rotor, a journal to rotatably fit said bearing, and a breaker cam of a size such as to pass through said bearing, a pinion removably secured to said shaft adjacent said cam, a distributor rotor mounted on said stud and having a gear engaged with said pinion, a cover engaged with the peripheral wall of the housing and affording a distributor chamber, segments mounted in said cover and extending into said chamber, and a distributor finger fixed to the distributor rotor for cooperating successively with said segments.

12. In a magneto, a stator including a pair of laminated pole pieces having outstanding parallel extensions terminating with end faces located in a common plane, a frame member to which said pole pieces are fixed, a core engaging said end faces one near one end and the other near the other end of the core, a generating winding carried by the core, and clips of spring metal fixed in spaced relation to one side face of said frame member one near each said extension for holding the core to said end faces, said side frame having a seat for each said clip to which the clip is clamped near one end and a tapped hole in said seat and a shoulder at one end of the seat, each clip having a hole therethrough near one end thereof, and screws one for each clip, each screw passing through the hole in the clip and threaded into said tapped hole for clamping the clip to its seat, each clip having at said end an inturned part to engage said shoulder, whereby to hold each clip so that the hole therein is aligned with the corresponding tapped hole while said screw is being tightened, the other end of each clip bearing on the core in a direction such as to press it toward said end face of the adjacent pole piece, each clip swinging when its screw is tightened about an axis where its said part engages the adjacent shoulder and increasing the pressure of its second-named end on the core.

13. In a magneto, a housing including an end wall and a peripheral wall; a stator including pole pieces, a connecting core and primary and secondary coils on the core; a magnetic rotor mounted in the housing and having pole shoes to cooperate with said pole pieces, a cover for said housing having an end wall and a peripheral wall to match the first-named peripheral wall, a distributor rotor rotatable with the magnetic rotor, a circular series of distributor segments mounted in the end wall of the cover, a carbon contact on the distributor rotor coaxial with the magnetic rotor, an interlead comprising a single piece of metal, a single screw for securing it on one end to said cover. said interlead extending along the inner wall of the cover and terminating with a spring end to engage said contact, barriers on said inner wall one on each side of the interlead to prevent it from turning on said screw, a contact on the secondary coil, and a connection from said screw to said contact.

STANLEY R. ELLINGHAM.
ALLEN L. BROWNLEE.

REFERENCES CITED

The following references are of record in the file of this patent:

UNITED STATES PATENTS

| Number | Name | Date |
|---|---|---|
| 1,817,410 | Heinrich | Aug. 4, 1931 |
| 1,873,114 | Davis | Aug. 23, 1932 |
| 1,954,087 | Martin | Apr. 9, 1935 |
| 1,989,629 | Schneider | Jan. 27, 1935 |
| 2,007,373 | Kangsted | July 9, 1935 |
| 2,232,451 | Harmon | Feb. 18, 1941 |
| 2,286,232 | Scott | June 16, 1942 |

FOREIGN PATENTS

| Number | Country | Date |
|---|---|---|
| 434,269 | Great Britain | Aug. 28, 1935 |